US011789928B2

(12) United States Patent
Kwatra et al.

(10) Patent No.: US 11,789,928 B2
(45) Date of Patent: Oct. 17, 2023

(54) DYNAMIC NAMESPACE MODIFICATION FOR VIRTUAL AGENTS

(71) Applicant: INTERNATIONAL BUSINESS MACHINES CORPORATION, Armonk, NY (US)

(72) Inventors: Shikhar Kwatra, San Jose, CA (US); Zachary A. Silverstein, Austin, TX (US); Komminist Weldemariam, Ottawa (CA); Madeleine Eve Barker, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 16/949,729

(22) Filed: Nov. 12, 2020

(65) Prior Publication Data

US 2022/0147506 A1 May 12, 2022

(51) Int. Cl.
*G06F 16/23* (2019.01)
*G06F 9/451* (2018.01)

(52) U.S. Cl.
CPC .......... *G06F 16/2365* (2019.01); *G06F 9/453* (2018.02); *G06F 16/2379* (2019.01)

(58) Field of Classification Search
CPC ... G06F 16/2365; G06F 9/453; G06F 16/2379
See application file for complete search history.

(56) References Cited

U.S. PATENT DOCUMENTS

| 3,870,034 A | 3/1975 | James |
| 6,115,482 A | 9/2000 | Sears |
| 6,743,021 B2 | 6/2004 | Prince |

(Continued)

FOREIGN PATENT DOCUMENTS

| EP | 2490155 A1 | 8/2012 |
| KR | 101982848 B1 | 5/2019 |

OTHER PUBLICATIONS

Anonymous, "Health Catalyst Data Operating System (DOS™)," HealthCatalyst.com, [accessed on Jul. 7, 2020], 4 pages, Retrieved from the Internet: <URL: https://www.healthcatalyst.com/product/health-catalyst-data-operating-system-dos-2/>.

(Continued)

*Primary Examiner* — Robert W Beausoliel, Jr.
*Assistant Examiner* — Mohammad S Bhuyan
(74) *Attorney, Agent, or Firm* — Samuel A. Waldbaum (57) ABSTRACT

A method comprising retrieving a plurality of invalid user first commands and a plurality of user responses stored in a memory, wherein each of plurality of invalid user verbal commands are commands to a smart hub requesting a first smart device perform an action, wherein each of the plurality of invalid commands includes at least a first name for the first smart device, wherein the first name is not a valid name for the first smart device. Determining a trend within the retrieved plurality of invalid user verbal commands and a plurality of user responses, wherein the trend identifies the first name as being used a plurality of times and identifies the first smart device the user was referring to when the user used the first name. Automatically updating a namespace database to include the first name as an alias for a setup name for the first smart device.

20 Claims, 5 Drawing Sheets

(56) References Cited

U.S. PATENT DOCUMENTS

| | | | |
|---|---|---|---|
| 6,948,937 | B2 | 9/2005 | Tretiakoff |
| 7,330,971 | B1 | 2/2008 | Kukreja |
| 7,392,479 | B2 | 6/2008 | Jones |
| 8,150,107 | B2 | 4/2012 | Kurzweil |
| 9,948,603 | B1 | 4/2018 | Lee |
| 10,678,855 | B2 | 6/2020 | Vaughn |
| 10,950,254 | B2 | 3/2021 | Vaughn |
| 2004/0058301 | A1 | 3/2004 | Glenberg |
| 2004/0218451 | A1 | 11/2004 | Said |
| 2005/0286743 | A1 | 12/2005 | Kurzweil |
| 2016/0036764 | A1 | 2/2016 | Dong |
| 2016/0135241 | A1 | 5/2016 | Gujral |
| 2016/0366123 | A1 | 12/2016 | Smith |
| 2017/0357480 | A1* | 12/2017 | La Placa ............... G06N 3/006 |
| 2018/0034913 | A1 | 2/2018 | Matthieu |
| 2018/0122378 | A1* | 5/2018 | Mixter ................ G10L 15/22 |
| 2020/0105259 | A1* | 4/2020 | Lin .................... G10L 15/30 |
| 2020/0310749 | A1* | 10/2020 | Miller ............... G06F 9/4881 |
| 2021/0256974 | A1* | 8/2021 | Boettger ............. G10L 15/30 |

OTHER PUBLICATIONS

Hock, et al., "Reading Comprehension Strategies for Adult Literacy Outcomes," Journal of Adolescent & Adult Literacy, Nov. 2005, pp. 192-200, vol. 49, No. 3, Retrieved from the Internet: <URL: http://www.jstor.org/stable/40017582>.

Jiang, et al., "An AR-based hybrid approach for facility layout planning and evaluation for existing shop floors," SpringerLink, Feb. 16, 2014 [accessed on Jul. 7, 2020], 13 pages, Retrieved from the Internet: <URL: https://link.springer.com/article/10.1007/s00170-014-5653-6>.

Just, "Understanding Risk Stratification, Comorbidities, and the Future of Healthcare," HealthCatalyst.com, 2017, 7 pages, Retrieved from the Internet: <URL: https://www.healthcatalyst.com/understanding-risk-stratification-comorbidities/>.

Khazan, "This App Reads Your Emotions on Your Face," The Atlantic, Jan. 15, 2014 [accessed on Jun. 8, 2020], 10 pages, Retrieved from the Internet: <URL: https://www.theatlantic.com/technology/archive/2014/01/this-app-reads-your-emotions-on-your-face/282993/>.

Mell, et al., "The NIST Definition of Cloud Computing", National Institute of Standards and Technology, Special Publication 800-145, Sep. 2011, 7 pages.

Verma, et al., "Cloud-centric IoT based disease diagnosis healthcare framework," Journal of Parallel and Distributed Computing., 2017, 13 pages, Retrieved from the Internet: <URL: https://www.researchgate.net/publication/321658411_Cloud-centric_IoT_based_disease_diagnosis_healthcare_framework>.

Wang, et al., "Designing Virtual Construction Worksite Layout in Real Environment via Augmented Reality," ISAR02006, 2006, pp. 757-761, Retrieved from the Internet: <URL: http://www.iaarc.org/publications/fulltext/isarc2006-00010_200605231642.pdf>.

* cited by examiner

DYNAMIC NAMESPACE MODIFICATION FOR VIRTUAL AGENTS

BACKGROUND

The present invention relates generally to the field of virtual agents, and more particularly to updating a namespace for a smart device controlled by a virtual agent.

Virtual agents or virtual assistant are increasing in popularity with consumers. A virtual agent can be included in a smart hub or as an application on a computing device. The virtual agent controls smart devices connected to the smart hub. A user issues verbal commands to the smart hub and the virtual agent executes the user verbal command when it is a valid command. A valid command can include the name of the virtual agent, the name of the smart device, and the action the user wants the smart device to perform, for example, the action can be to power on/off, volume control, light control, temperature control, etc. The name of the smart device can be implied by the requested action, for example, the command can be "play this song," where the smart device implied in this command is the smart speaker.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for automatically identifying new names to be associated with smart devices and updating the stored names to include the identified new names.

A method, the method comprising retrieving a plurality of invalid user first commands and a plurality of user responses stored in a memory, wherein each of plurality of invalid user commands are commands to a smart hub requesting a first smart device perform an action, wherein each of the plurality of invalid commands includes at least a first name for the first smart device, wherein the first name is not a valid name for the first smart device. Determining a trend within the retrieved plurality of invalid user commands and a plurality of user responses, wherein the trend identifies the first name as being used a plurality of times and identifies the first smart device the user was referring to when the user used the first name. Automatically updating a namespace database to include the first name as an alias for a setup name for the first smart device. Receiving a new user command, wherein the new user command includes the first name. Recognizing that the first name used in the new user command as the alias for the setup name for the first smart device and transmitting the command to be executed by the first smart device.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for automatically identifying new names for a smart device from the user's invalid verbal commands and the user responses to the invalid verbal commands. A smart hub can be any type of smart home device that is able to connect and control other smart devices. The smart hub can be a standalone device, or it can be integrated into another computing device, for example, a smart phone. During a setup process to connect a smart device to a smart hub the user to provides a name to be associated with the newly connected smart device. The provided name can be the default name associated with the smart device or the user can create a unique name to be associated with the smart device. The name of the smart device allows the smart hub to associate the user verbal command with the smart device that the user wants to perform the action. For example, a lamp located in a room might have been given the name living room lamp during the setup process. So, when a user issues a verbal command "turn on the living room lamp" to the smart hub, then the smart hub knows which smart device to turn on. However, the user does not always use the proper name (i.e. the name assigned during setup) of the smart device when issuing the verbal command. For example, the user can issue a verbal command "turn on the lamp" but the name "lamp" is not associated with a smart device, so the smart hub does not execute the command. The smart hub monitors how the user responds when the verbal command is not executed. For example, the user might issue a new verbal command using the correct name for the smart device, the user might manually do the action he requested, the user might provide an emotional response, or a different response. The smart hub tracks the invalid verbal commands (e.g. commands that the smart hub does not execute), the reasons why the invalid verbal commands were not executed, and the user responses to the invalid verbal commands to determine a trend within the tracked data. For example, a trend in the tracked data can be the user consistently issuing a verbal command using an invalid name for the smart device and then manually performing the requested action on a smart device. The smart hub can determine which smart device the user was referring to when using the invalid name based on the user responses. The smart hub can update the names associated with the smart device to include an alias (i.e. the invalid name) for the smart device. The smart hub automatically updates the name to include the alias for the smart device as the user continues to issue new verbal commands for the smart hub to execute. With the alias now added, the next time the user issues a verbal command using the invalid name (i.e. the alias), then the smart hub can execute the command properly.

Figure 1:
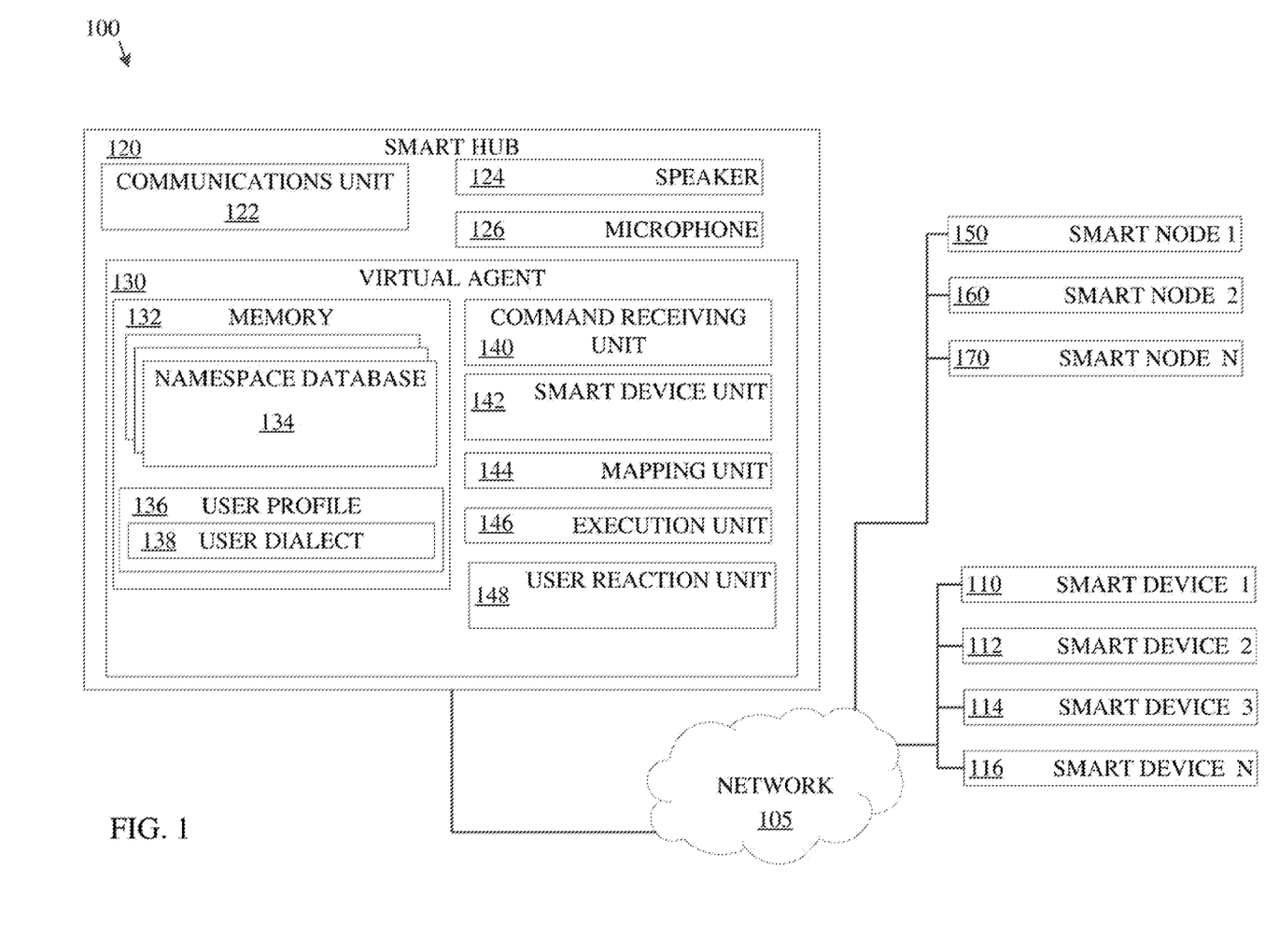
FIG. 1 is a functional block diagram illustrating a smart processing environment, in accordance with an embodiment of the present invention.

FIG. 1 is a functional block diagram illustrating a smart processing environment 100, in accordance with an embodiment of the present invention.

The smart processing environment 100 includes a smart hub 120, one or more smart devices 110, 112, 114, and 116, and can include one or more smart nodes 150, 160, and 170 that communicate with each other via the network 105.

Network 105 can be, for example, a local area network (LAN), a wide area network (WAN) such as the Internet, or a combination of the two, and can include wired, wireless, or fiber optic connections. In general, network 105 can be any combination of connections and protocols that will support communications between smart hub 120, smart devices 110, 112, 114, 116, and smart nodes 150, 160, 170.

FIG. 1 illustrates a plurality of smart devices 110, 112, 114, and 116, but only one smart device 110 is required. The smart device 110 can be for example, a smart light bulb, a smart television, a smart thermostat, a smart oven, a smart washer, a smart appliance, a smart lamp, or any other type of smart device. The smart device 110 connects to the smart hub 120 and the smart device 110 receives commands for it to execute. For example, the commands received by the smart device 110 can be to power on/off, change volume, change channel, preheat, etc. During the setup phase of the smart device 110 (i.e. when the smart device 110 is first connected to the smart hub 120), the user provides a name to the smart hub 120 to associate with the smart device 110. The provided name can be the default name associated with the smart device 110 or the user can create a unique name to be associated with the smart device 110. As each smart device 112, 114, 116 is connected to the smart hub 120, the user provides a name to associate with each of the smart devices 112, 114, 116.

Figure 4:
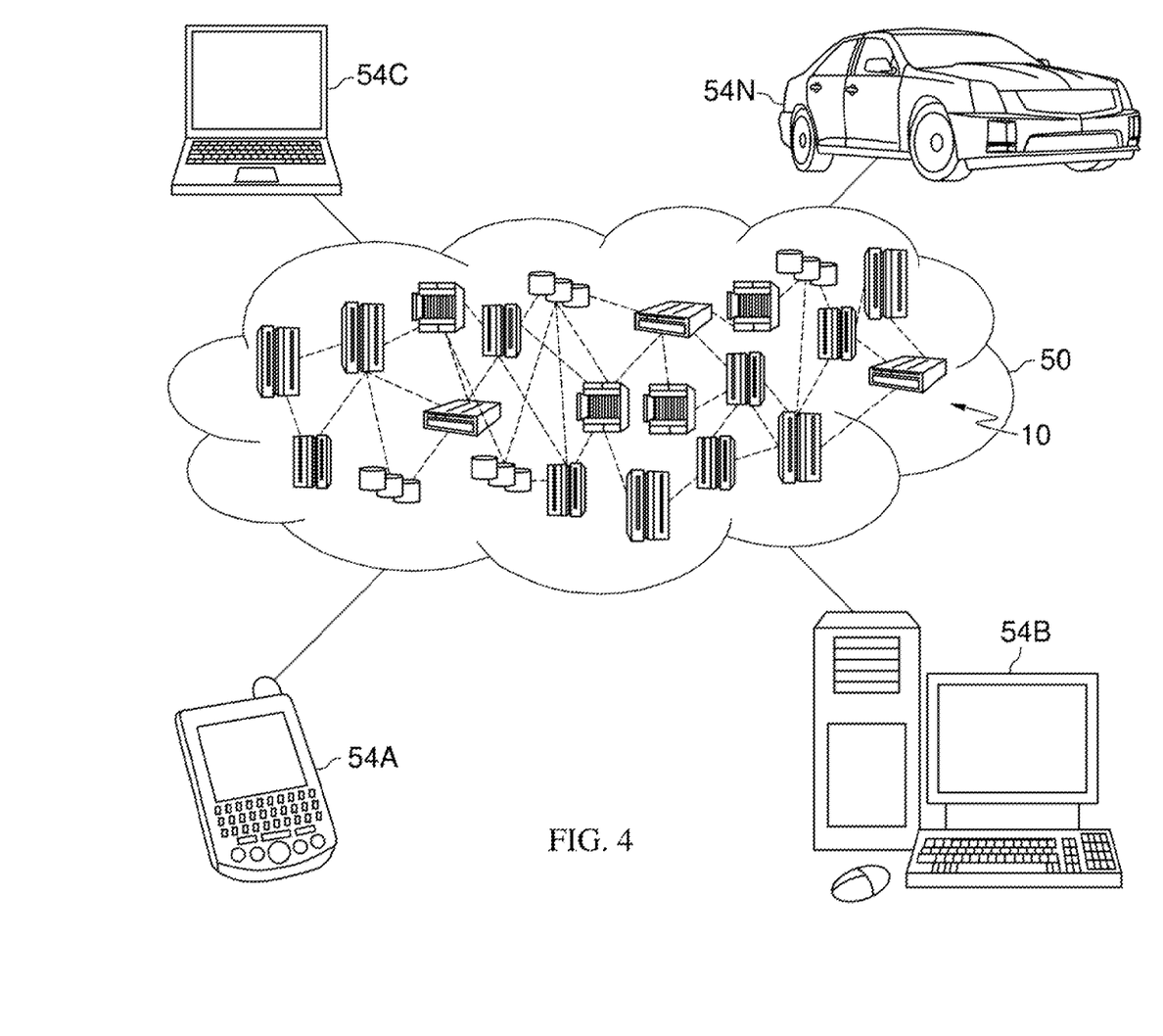
FIG. 4 depicts a cloud computing environment according to an embodiment of the present invention.
Figure 5:
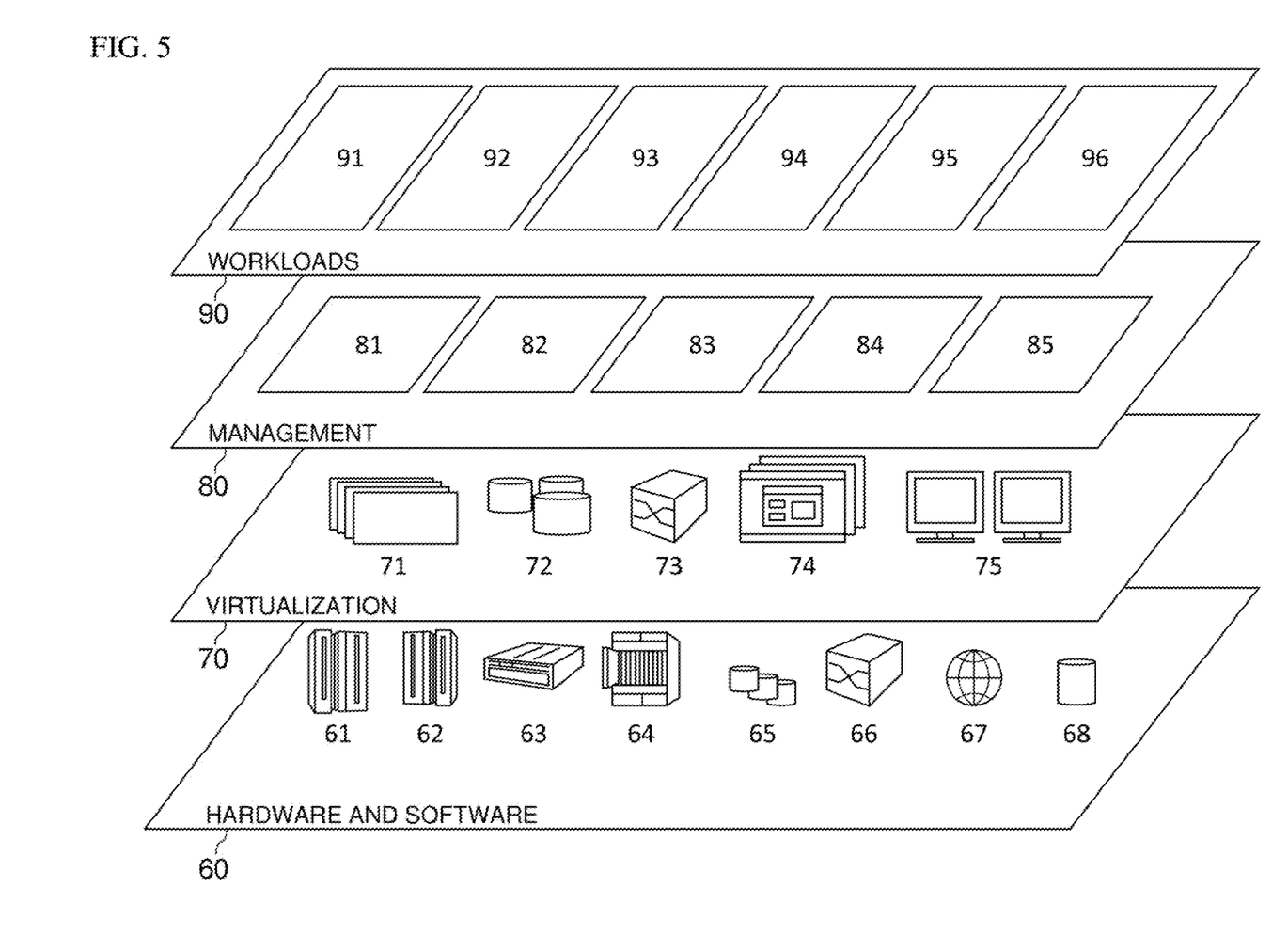
FIG. 5 depicts abstraction model layers according to an embodiment of the present invention.

The smart hub 120 can be an electronic device or it can be an application located on a computing device. Smart hub 120 may be a smart home device, a laptop computer, tablet computer, netbook computer, personal computer (PC), a desktop computer, a personal digital assistant (PDA), a smart phone, or any programmable electronic device capable of communicating with smart devices 110, 112, 114, 116, and smart nodes 150, 160, 170 via network 105. In other embodiments, smart hub 120 may include internal and external hardware components, as depicted, and described in further detail below with respect to FIG. 3, and operate in a cloud computing environment, as depicted in FIGS. 4 and 5.

The smart hub 120 may include a communications unit 122, a speaker 124, a microphone 126, and a virtual agent 130. The communications unit 122 allows for the smart hub 120 to transmit commands to the smart devices 110, 112, 114, 116 and to transmit and receive data from the smart nodes 150, 160, 170. When a smart hub 120 is located in a large house, or a large location, then the smart hub 120 might not have the range to connect to all the smart devices 110, 112, 114, 116 contained within the location. Smart nodes 150, 160, and 170 acts as repeaters to extend the range of the smart hub 120. The smart nodes 150, 160, 170 can be an additional smart hub 120 or a repeater unit. The smart nodes 150, 160, 170 can be assigned a specific designation, for example, bedroom, kid's room, basement, etc., and the connected smart devices 110, 112, 114, 116 can be connected to the smart hub 120 and/or the smart nodes 150, 160, 170.

The speaker 124 plays audio data, for example, the audio data can be music or voice statements that are generated by the virtual agent 130. The microphone 126 receives audio data from the user, for example, the audio data can be verbal commands for the virtual agent 130 to execute, or a user audio or verbal response to when the virtual agent 130 does not execute a command.

The virtual agent 130 includes a memory 132, a command receiving unit 140, a smart device unit 142, a mapping unit 144, an execution unit 146, and a user reaction unit 148. The memory 132 is a data store that stores data about the user, the connected smart devices, or other data. The memory 132 includes at least a namespace database 134 and a user profile 136. The namespace database 134 stores the designated names and any known aliases for the connected smart devices 110, 112, 114, 116. The known aliases are alternative names associated with the connected smart devices 110, 112, 114, 116, where the aliases are names that were automatically added to the namespace database 134. The known alias can be user specific or apply for all users. The user profile 136 stores information about each user, for example, a user dialect 138, where the user dialect 138 can be unique for each user.

The command receiving unit 140 receives the user verbal command via the microphone 126. The command receiving unit 140 analyzes the user verbal command to identify the different parts of the user verbal command. The user verbal command is usually composed of three parts, the first part of the user verbal command is calling the virtual agent 130 to indicate that he is about to issue a command. The second part of the user verbal command is the name of the smart device 110, 112, 114, 116 that he wants to interact with. The third part of the user verbal command is the action that the user wants the smart device 110, 112, 114, 116 to execute.

The smart device unit 142 determines when a smart device is connected to the smart hub 120 and determines what type of commands the smart device 110, 112, 114, 116 can execute. Different smart devices 110, 112, 114, 116 can execute different types of commands, for example, if the smart device 110 is an oven then the command can be to preheat the oven, and if the smart device 112 is a television then the command can be to change the channel or change the volume. The smart device unit 142 determines valid executable actions for each of the smart device 110, 112, 114, 116.

The mapping unit 144 maps the different smart devices 110, 112, 114, 116 to the smart hub 120 and the smart nodes 150, 160, 170. For example, a lamp (e.g. smart device 114) located in the bedroom can be connected to smart node 150 which is in the bedroom. The mapping unit 144 maps where the smart nodes 150, 160, 170, are with respect to the smart hub 120 and maps the smart devices 110, 112, 114, 116 to the device they each are connected to.

The execution unit 146 receives data from the command receiving unit 140, where the data includes the name for the smart device 110, 112, 114, 116 the user used in his verbal command and the action the user wants the smart device 110, 112, 114, 116 to execute. The execution unit 146 determines if the user verbal command is valid and executes a valid command. The execution unit 146 compares the identified name in the user verbal command to the names stored in the namespace database 134. When the identified name matches a stored name then the execution unit 146 determines it is a valid name, and when the identified name does not match a stored name then the execution unit 146 determines that the name used in the user verbal command is invalid. When the execution unit 146 determines that the name is valid then the execution determines if the action is valid. The execution unit 146 compares the action in the user verbal command to the determined valid actions of the smart device 110, 112, 114, 116 as determined by the smart device unit 142. When the execution unit 146 determines that the action is valid then the execution unit 146 sends the command to the named smart device 110, 112, 114, 116 to execute the action. When the execution unit 146 determines that the action is invalid, then the execution unit 146 sends a command to speaker 124 to play audio data indicating that the user verbal command could not be executed because the indicated smart device 110, 112, 114, 116 cannot perform the requested action.

When the execution unit 146 determines the name used in the user verbal command is invalid, the execution unit 146 sends a command to speaker 124 to play audio data indicating that the user verbal command could not be executed because the named used in the user verbal command is not associated with a smart device 110, 112, 114, 116. When the smart hub 120 is not able to execute the user's command based on an invalid name then the user reaction unit 148 stores the invalid user verbal command, including the invalid name, in the memory 132. The user reaction unit 148 monitors the user to see how the user reacts when the smart hub 120 informs the user that his command cannot be executed.

The user can react to an invalid user verbal command in multiple different ways, for example, the user's reaction can be a verbal response, a non-verbal response, or a combination thereof. A verbal response can be the user restating the command, but at a slower verbal speed and with better pronunciation. A verbal response can be the user stating the command again but using a different name for the smart device 110, 112, 114, 116. Another verbal response can be the user expressing their frustration for the smart hub 120 failing to execute the user verbal command. A non-verbal response could be the user hitting a surface, (e.g. hitting their hand on the table), where the microphone 126 would pick up noise of the impact. Another non-verbal response could be the user manually interacting with the smart device 110, 112, 114, 116 to perform the action he requested in his verbal command. The smart hub 120 would receive data from the smart device 110, 112, 114, 116 when the user manually interacts with it to perform the action manually. The user reaction unit 148 tracks the user reactions and stores each user reaction and the invalid user verbal command in the memory 132. The user reaction unit 148 analyzes the stored invalid user verbal commands and the user reactions to look for trends contained within the stored data. For example, the trend can be the same invalid name was used in a plurality of invalid user verbal commands and how the user responds to each of the invalid user verbal commands.

For example, a smart lamp in the living room is connected to the smart hub 120 and the lamp was given the name "living room lamp" when the lamp was initially connected to the smart hub 120. The user issues the command "smart hub turn on the lamp", but the execution unit 146 determines that this is an invalid command because the name lamp is not associated with any smart device 110, 112, 114, 116. The smart hub 120 plays an audio message on speaker 124 to inform the user of the invalid command and that the command cannot be executed. The user can respond by reissuing the verbal command using the same language, restating the verbal command but changing the phrasing, an emotional outburst prior to restating the verbal command, manually operating the smart device 110, 112, 114, 116, or a different user response. The user reaction unit 148 stores the invalid command and the user response in the memory 132 and when enough data is collected the user reaction unit 148 analyzes the stored data (a plurality of invalid user verbal commands and a plurality of user responses) to determine if there is a trend contained within the data. When the user reaction unit 148 determines a trend is associated with an invalid name (i.e. the name causing the invalid command) and the user reaction to the invalid commends indicates that the invalid name should be associated with a specific smart device 110, 112, 114, 116, then the user reaction unit 148 automatically adds the invalid name to the namespace database 134 as an alias for the name of the smart device 110, 112, 114, 116. Therefore, when the user issues a new command using the invalid name (i.e. the alias name), the execution unit 146 recognizes the alias name as a name associated with a smart device 110, 112, 114, 116 and has the smart device 110, 112, 114, 116 execute the action the user requested.

The user reaction unit 148 determines a trend in the user responses to a plurality of failed user verbal commands. For example, the trend can be the user using the correct name for the smart device 110 right after the user used an invalid name in an invalid user verbal command. When this happens a plurality of times, then the user reaction unit 148 realizes the invalid name should be recognized as an alias for the name of the smart device 110. The user reaction unit 148 updates the namespace database 134 to add the invalid name as an alias for the name associated with the smart device 110. Another example, the user could be using the correct name for the smart device 112 but because of the user accent or dialect the name used in the user verbal command was determined to be invalid by the execution unit 146. The trend can be, for example, the user slowly restating the verbal command while concentrating on the pronunciation of each of the words in the verbal command. When this happens a plurality of times, then the user reaction unit 148 realizes the invalid name is the correct name, but because of the user's accent or dialect it registers as an invalid name, thus the invalid name should be recognized as an alias for the name associated with the smart device 112. The user reaction unit 148 updates the namespace database 134 to add the invalid name as an alias to the name associated with a smart device 112 and updates the user dialect 138 about the user accent/dialect.

Another example of a trend can be the user manually interacting with the smart device 114 right after the invalid verbal command and performing the action the user requested in his verbal command. When this happens a plurality of times, then the user reaction unit 148 realizes the invalid name should be recognized as an alias for the name associated with the smart device 114. The user reaction unit 148 updates the namespace database 134 to add the invalid name as an alias to the name associated with a smart device 114. Therefore, when the user uses the invalid name again in a verbal command, then the execution unit 146 recognizes the invalid name as an alias for the name associated with the smart device 114 and will have the smart device 114 execute the requested action. By recognizing the trends in the invalid verbal commands caused by the use of invalid names and the user responses to the invalid verbal commands, allows the virtual agent 130 to automatically recognize additional names the smart devices 110, 112, 114, 116 should be known by.

The trends described here are meant only to be examples of the trends that the user reaction unit 148 can detect from the stored data. The examples are not meant to be limiting. The virtual agent 130 can be utilized by multiple users, therefore each user could have the same or different alias for the name associated with the same smart device 110, 112, 114, 116.

Figure 2:
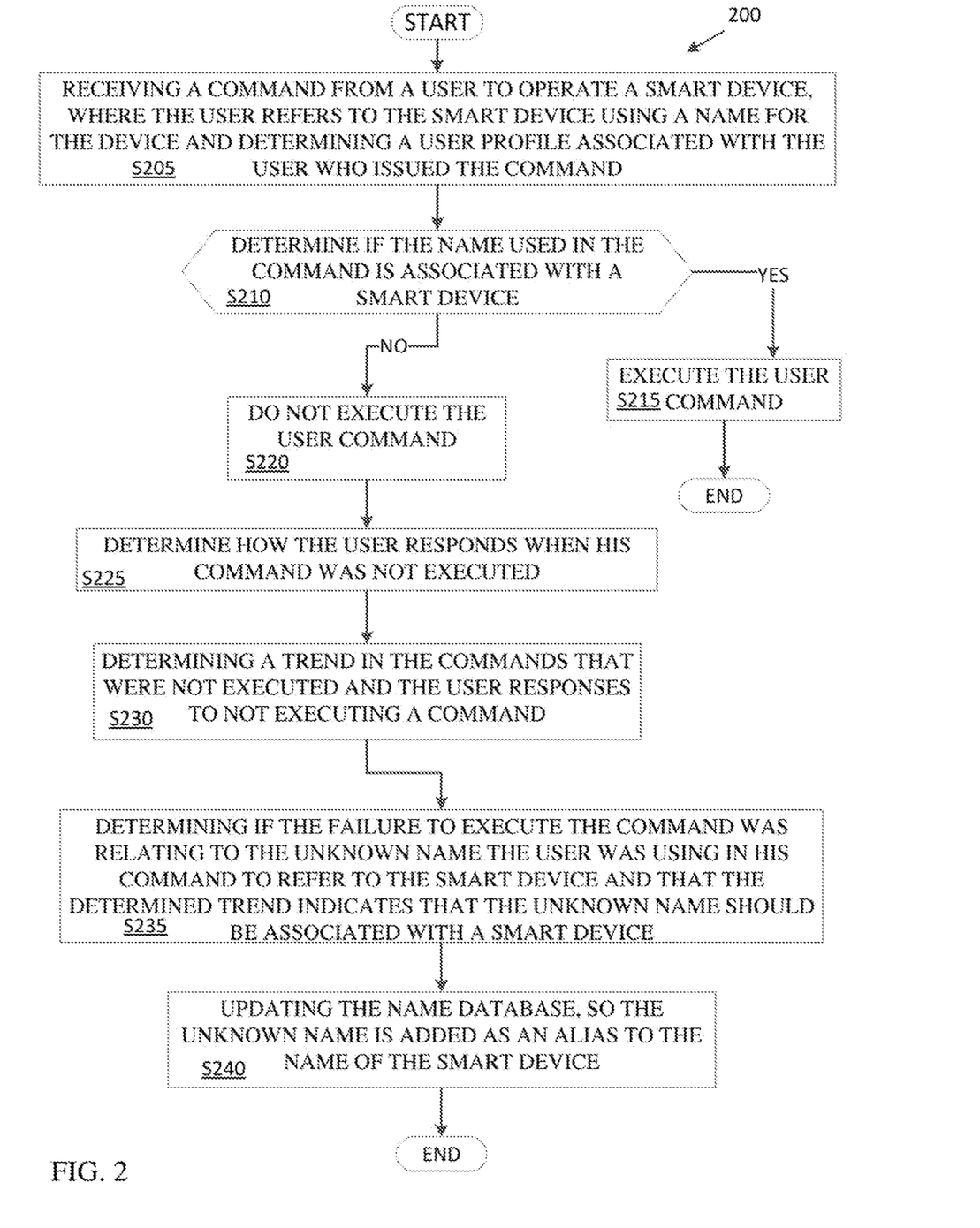
FIG. 2 is a flowchart depicting operational steps identify additional names for a smart device within the smart environment of FIG. 1, in accordance with an embodiment of the present invention.

FIG. 2 is a flowchart depicting operational steps 200 identify additional names for a smart device within the smart environment of FIG. 1, in accordance with an embodiment of the present invention.

The smart hub 120 receives a verbal command from a user where the verbal command is asking the virtual agent 130 to have a smart device 110, 112, 114, 116 perform an action (S205). The command receiving unit 140 analyzes the user verbal command to identify a name (e.g. the name of the smart device 110) and the action (for the smart device 110 to execute) contained within the verbal command (S205). The execution unit 146 determines which user gave the verbal command and retrieves the user profile 136 associated with the user (S205). The execution unit 146 determines if the name used in the user verbal command is associated with a smart device 110, 112, 114, 116. The execution unit 146 compares the name used in the verbal command to the names stored in the namespace database 134 to see if the name is associated with a smart device 110, 112, 114, 116 (S210). When the name is known and associated with a smart device 110, 112, 114, 116, and the requested action is valid, then the execution unit 146 transmits a command to the named smart device 110, 112, 114, 116, to execute the user requested action (S215).

When the execution unit 146 determines that the named used in the user verbal command is not associated with a smart device 110, 112, 114, 116 (i.e. an invalid name), then the execution unit 146 determines that the user verbal command is invalid and does not execute the user verbal command (S220). The execution unit 146 notifies the user that the command is invalid, for example, by utilizing the speaker 124 to play an audio message to the user that indicates the user verbal command is invalid (S220). The execution unit 146 stores the invalid user verbal command in the memory 132 (S220). Once the user is notified of the invalid user verbal command then the user reaction unit 148 monitors the user response to the notification (S225). The user response can be, for example, the user could reissue the verbal command, give an emotional verbal or non-verbal response, or the user could manually interact with the smart device 110, 112, 114, 116 (S230). The user reaction unit 148 stores the user response in the memory 132 (S225). Once a plurality of user responses and invalid user verbal commands are stored in the memory 132, then the user reaction unit 148 determines if a trend can be found in the stored data (S230). The user reaction unit 148 determines if the determined trend found in the stored data can be associated with a specific invalid name (S235). The user reaction unit 148 determines if the invalid name should be associated with a specific smart device 110, 112, 114, 116 based on the determined trend of the user responses to the invalid user verbal command (S235). When the user reaction unit 148 determines that the invalid name should be associated with a smart device 110, 112, 114, 116, then the user reaction unit 148 automatically updates the namespace database 134 associated with the specific smart device 110, 112, 114, 116 to include the invalid name as an alias of the name associated with the specific smart device 110, 112, 114, 116 (S240). Therefore, the next time the user uses the invalid name (i.e. the alias) in a user verbal command, then the execution unit 146 determines that the name is a known alias for a smart device 110, 112, 114, 116 and transmits the action in the user verbal command to the smart device 110, 112, 114, 116 to be executed.

Figure 3:
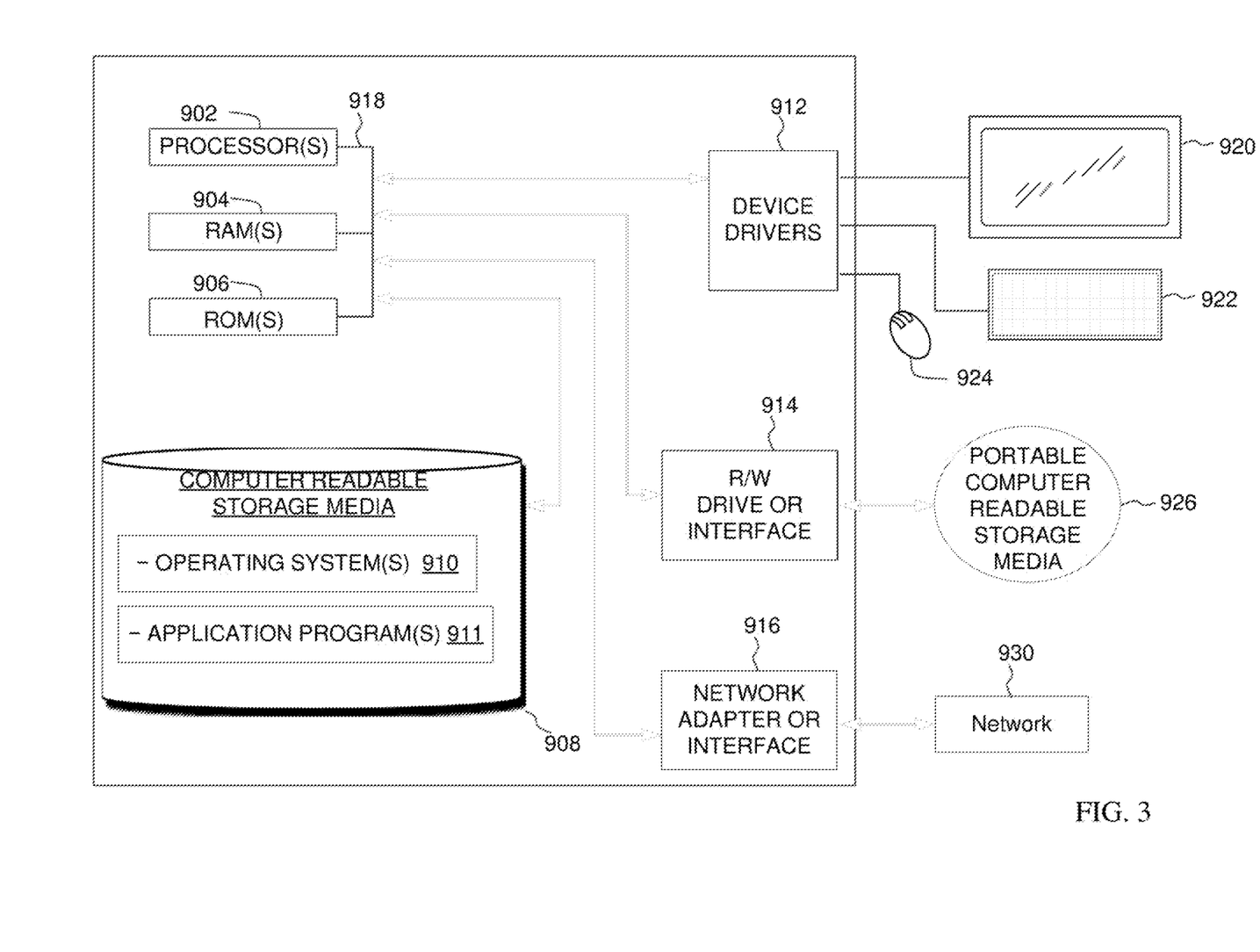
FIG. 3 is a block diagram of components of a computing device of the smart processing systems of FIG. 1, in accordance with embodiments of the present invention.

FIG. 3 depicts a block diagram of components of smart hub 120 of smart processing environment 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Smart hub 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, virtual agent 130 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Smart hub 120 may also include a R/W drive or interface 914 to read from and write to one or more portable computer readable storage media 926. Application programs 911 on smart hub 120 may be stored on one or more of the portable computer readable storage media 926, read via the respective R/W drive or interface 914 and loaded into the respective computer readable storage media 908.

Smart hub 120 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on smart hub 120 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Smart hub 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, RAY drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual agent 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method comprising:
    retrieving, by a computer, a plurality of invalid user first commands and a plurality of user responses stored in a memory, wherein each of plurality of invalid user commands includes an invalid device name and an action to be performed by a first smart device, wherein the invalid device name does not correspond with a device name associated with the first smart device;
    determining, by the computer, a trend within the retrieved plurality of invalid user commands and the plurality of user responses stored in the memory, wherein the trend identifies the invalid device name is used a plurality of times in the plurality of invalid user first commands, wherein the invalid device name is associated with the first smart device based on the trend;
    automatically updating, by the computer, a namespace database to include the invalid device name as an alias associated with the first smart device;
    receiving, by the computer, a new user command, wherein the new user command includes the invalid device name and a new action to be executed;
    recognizing, by the computer, the invalid device name used in the new user command as the alias associated with the first smart device; and
    transmitting, by the computer, the new action to be executed by the first smart device.

2. The method of claim 1, further comprising:
    receiving, by the computer, the first user command;
    determining, by the computer, that the first user command includes a device name and an action to be executed;
    determining, by the computer, that the device name is invalid and not associate with a smart device; and
    notifying, by the computer, the user that the user command could not be executed because the device named used in the first command as not valid.

3. The method of claim 2, wherein determining, by the computer, that the device name is invalid comprises:
    comparing, by the computer, the device name in the first user command to stored names for at least one smart device and determining that the device name does not match one of the stored names.

4. The method of claim 2, further comprises:
    monitoring, by the computer, the user response to being notified the first user command as being invalid; and
    storing, by the computer, the first user command as an invalid user command and storing the user response in the memory.

5. The method of claim 4, wherein the user response is a verbal response.

6. The method of claim 5, wherein the verbal response is the user restating the first command but using a second device name.

7. The method of claim 6, further comprising:
    determining, by the computer, that the second device name is valid by comparing the second device name to stored names for at least one smart device and determining that the second device name matches one of the stored names.

8. The method of claim 4, wherein the user response is a non-verbal response.

9. The method of claim 8, wherein the non-verbal response is the user manually interacting with the at least one smart device.

10. A computer program product comprising:
one or more non-transitory computer-readable storage media and program instructions stored on the one or more non-transitory computer-readable storage media, the program instructions comprising:
program instructions to retrieve a plurality of invalid user first commands and a plurality of user responses stored in a memory, wherein each of plurality of invalid user commands includes an invalid device name and an action to be performed by a first smart device, wherein the invalid device name does not correspond with a device name associated with the first smart device;
program instructions to determine a trend within the retrieved plurality of invalid user commands and the plurality of user responses stored in the memory, wherein the trend identifies the invalid device name is used a plurality of times in the plurality of invalid user first commands, wherein the invalid device name is associated with the first smart device based on the trend;
program instructions to automatically update a namespace database to include the invalid device name as an alias associated with the first smart device;
program instructions to receive a new user command, wherein the new user command includes the invalid device name and a new action to be executed;
program instructions to recognize the invalid device name used in the new user command as the alias associated with the first smart device; and
program instructions to transmit the new action to be executed by the first smart device.

11. The computer program product of claim 10, further comprising:
program instructions to receive the first user command;
program instructions to determine that the first user command includes a device name and an action to be executed;
program instructions to determine that the device name is invalid and not associate with a smart device; and
program instructions to notify the user that the user command could not be executed because the device named used in the first command as not valid.

12. The computer program product of claim 11, wherein determining, by the computer, that the name is invalid comprises:
program instructions to compare the device name in the first user command to stored names for at least one smart device and determining that the device name does not match one of the stored names.

13. The computer program product of claim 11, further comprises:
program instructions to monitor the user response to being notified the first user command as being invalid; and
program instructions to store the first user command as an invalid user command and storing the user response in the memory.

14. The computer program product of claim 13, wherein the user response is a verbal response.

15. The computer program product of 14, wherein the verbal response is the user restating the first command but using a second device name.

16. The computer program product of claim 15, further comprising:
program instructions to determine that the second device name is valid by comparing the second device name to stored names for at least one smart device and determining that the second device name matches one of the stored names.

17. The computer program product of claim 11, wherein the user response is a non-verbal response.

18. The computer program product of claim 15, wherein the non-verbal response is the user manually interacting with the at least one smart 4.

19. A computer system comprising:
one or more computer processors, one or more computer-readable storage media, and program instructions stored on the one or more of the computer-readable storage media for execution by at least one of the one or more processors, the program instructions comprising:
program instructions to retrieve a plurality of invalid user first commands and a plurality of user responses stored in a memory, wherein each of plurality of invalid user commands includes an invalid device name and an action to be performed by a first smart device, wherein the invalid device name does not correspond with a device name associated with the first smart device;
program instructions to determine a trend within the retrieved plurality of invalid user commands and the plurality of user responses stored in the memory, wherein the trend identifies the invalid device name is used a plurality of times in the plurality of invalid user first commands, wherein the invalid device name is associated with the first smart device based on the trend;
program instructions to automatically update a namespace database to include the invalid device name as an alias associated with the first smart device;
program instructions to receive a new user command, wherein the new user command includes the invalid device name and a new action to be executed;
program instructions to recognize the invalid device name used in the new user command as the alias associated with the first smart device; and
program instructions to transmit the new action to be executed by the first smart device.

20. The computer system of claim 19, further comprises:
program instructions to receive the first user command;
program instructions to determine that the first user command includes a device name for and an action to be executed;
program instructions to determine that the device name is invalid and not associate with a smart device; and
program instructions to notify the user that the user command could not be executed because the device named used in the first command as not valid;
program instructions to monitor the user response to being notified the first user command as being invalid; and
program instructions to store the first user command as an invalid user command and storing the user response in the memory.

* * * * *